(12) United States Patent
Yang et al.

(10) Patent No.: US 10,054,224 B2
(45) Date of Patent: Aug. 21, 2018

(54) PARKING BRAKE

(71) Applicant: INDUSTRIAL TECHNOLOGY RESEARCH INSTITUTE, Hsinchu (TW)

(72) Inventors: Ming-Hsien Yang, Taipei (TW); Meng-Ru Wu, Taipei (TW); Jui-Tang Tseng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 127 days.

(21) Appl. No.: 15/384,234

(22) Filed: Dec. 19, 2016

(65) Prior Publication Data

US 2018/0105149 A1 Apr. 19, 2018

(30) Foreign Application Priority Data

Oct. 14, 2016 (TW) .............................. 105133353 A

(51) Int. Cl.
*F16H 63/34* (2006.01)
*B60T 1/06* (2006.01)
*B60T 1/00* (2006.01)

(52) U.S. Cl.
CPC .......... *F16H 63/3433* (2013.01); *B60T 1/005* (2013.01); *B60T 1/062* (2013.01); *F16H 63/3425* (2013.01); *F16H 63/3441* (2013.01)

(58) Field of Classification Search
None
See application file for complete search history.

(56) References Cited

U.S. PATENT DOCUMENTS

| 4,223,768 A | 9/1980 | Iwanaga |
| 4,310,081 A | 1/1982 | Kolacz |
| 5,829,328 A | 11/1998 | Chen |

(Continued)

FOREIGN PATENT DOCUMENTS

| CN | 101905690 A | 12/2010 |
| CN | 104006157 A | 8/2014 |

(Continued)

OTHER PUBLICATIONS

Automobile CVT Shift and Park Mechanism and Powered Lift Gate Simulation Using ADAMS and CATIA (2000).

(Continued)

*Primary Examiner* — Jacob S. Scott
(74) *Attorney, Agent, or Firm* — Maschoff Brennan

(57) ABSTRACT

A parking brake includes transmission shaft, park gear and parking assembly. The park gear is connected to the transmission shaft. The parking assembly includes holder and engagement mechanisms. The holder on the transmission shaft is slidable in axial direction of the transmission shaft. The engagement mechanism includes engagement body and elastic member. The engagement body is furnished on the holder and slidable in a radial direction of the transmission shaft. The elastic members are connected to the holder and located between the holder and the engagement bodies. The engagement bodies protrude from a surface of the holder. When the parking assembly is moved toward the park gear, and some of the engagement bodies are pressed and moved with respect to the holder, the park gear is engaged with some of the plurality of engagement mechanisms not moved with respect to the holder.

20 Claims, 12 Drawing Sheets

(56) References Cited

U.S. PATENT DOCUMENTS

| | | | |
|---|---|---|---|
| 6,023,999 | A | 2/2000 | Cho |
| 6,138,534 | A | 10/2000 | Cho |
| 6,994,650 | B2 | 2/2006 | Allen et al. |
| 7,556,135 | B2 | 7/2009 | Kasuya |
| 7,621,387 | B2 | 11/2009 | Lin et al. |
| 7,886,637 | B2 | 2/2011 | Campbell et al. |
| 8,505,705 | B2 | 8/2013 | Keating |
| 8,631,916 | B2 | 1/2014 | Mazzucchi et al. |
| 2010/0108460 | A1 | 5/2010 | Nakamura et al. |
| 2016/0153558 | A1 | 6/2016 | Sten et al. |

FOREIGN PATENT DOCUMENTS

| | | |
|---|---|---|
| DE | 10 2005 058 821 A1 | 6/2007 |
| EP | 2757004 A1 | 7/2014 |
| TW | I293604 B | 2/2008 |
| TW | 200940265 A | 10/2009 |
| TW | I321623 B | 3/2010 |
| TW | M525408 U | 7/2016 |
| WO | 2014080956 A1 | 5/2014 |

OTHER PUBLICATIONS

Design Study of Lightweight Automatic Transmission Parts for Vehicles Using Level Set-Based Topology Optimization (Apr. 5, 2016).
Novel Design of the Integrated Electric Parking Brake System (Oct. 10, 2010).
Park Pawl Dynamic System Engagement Speed Calculation Using Isight (Apr. 14, 2015).
Parking Brake Use Study (Apr. 8, 2013).
Simulation of a Parking Pawl Mechanism with ABAQUS-Standard and ABAQUS-Explicit (2000).
TW Notice of Allowance dated Jul. 4, 2017 as received in Application No. 105133353.

PARKING BRAKE

CROSS-REFERENCE TO RELATED APPLICATIONS

This non-provisional application claims priority under 35 U.S.C. § 119(a) on Patent Application No(s). 105133353 filed in Taiwan, R.O.C. on Oct. 14, 2016, the entire contents of which are hereby incorporated by reference.

TECHNICAL FIELD

The disclosure relates to a parking brake, more particularly to a parking brake having a plurality of movable engagement mechanisms.

BACKGROUND

A parking brake is used to lock the rotation of a vehicle transmission shaft. There are two types of parking brakes: the first type is that the braking force is applied in the radial direction of the vehicle transmission shaft, and the second type is that the braking force is applied in the axial direction of the vehicle transmission shaft. In detail, the first type of parking brake has an engaging part which is a pivotable pawl, and an end of the pawl is able to be moved close to or away from the park gear in the radial direction of the vehicle transmission shaft, for engaging with or disengaging from the park gear. The second type of parking brake has a plurality of protrusions formed on a disk brake, when the parking brake is moved close to the park gear in the axial direction of the transmission shaft, the protrusions are engaged with the park gear, for stopping the park gear.

However, in these two types of parking brakes, the engaging part (i.e. the pawl or the protrusions formed on the disk brake) is usually not fully and directly engaged to the park gear at the first place, but directly hits the teeth of the park gear before the engagement, which may cause wear of the parking brake and shorten the lifespan of the parking brake. In such a case, the park gear is required to be further pivoted by a few degrees for the engaging part to fully engage.

SUMMARY

The present disclosure provides a parking brake for solving the problem that traditional pawl is usually not fully and directly engaged to the park gear causing the pawl to unexpectedly hit the teeth of the park gear.

One embodiment of the disclosure provides a parking brake including a transmission shaft, a park gear and at least one parking assembly. The park gear is coaxially connected to the transmission shaft. The park gear is rotatable by the transmission shaft. The parking assembly includes a holder and a plurality of engagement mechanisms. The holder is furnished on the transmission shaft and slidable in an axial direction of the transmission shaft. The engagement mechanism includes an engagement body and an elastic member. The engagement body is a cylinder-shaped object. The engagement body is furnished on the holder and slidable in the axial direction of the transmission shaft. The elastic members are connected to the holder and respectively connected to the engagement bodies. The elastic members are located between the holder and the engagement bodies. The engagement bodies protrude from a surface of the holder. When the parking assembly is moved toward the park gear, and some of the engagement bodies are pressed by the park gear to be moved with respect to the holder, the park gear is engaged with some of the engagement bodies which are not moved with respect to the holder. When the parking assembly is moved away from the park gear, the park gear is disengaged from the plurality of engagement mechanisms.

One embodiment of the disclosure provides a parking brake including a transmission shaft, a park gear and at least one parking assembly. The park gear is coaxially connected to the transmission shaft. The park gear is rotatable by the transmission shaft. The parking assembly includes a holder and a plurality of engagement mechanisms. The holder is furnished on the transmission shaft and slidable in an axial direction of the transmission shaft. The engagement mechanism includes an engagement body and an elastic member. The engagement body is a plate shaped object. The engagement body is furnished on the holder and slidable in a radial direction of the transmission shaft. The elastic members are connected to the holder and respectively connected to the engagement bodies. The elastic members are located between the holder and the engagement bodies. The engagement bodies protrude from a surface of the holder. When the parking assembly is moved toward the park gear, and some of the engagement bodies are pressed by the park gear to be moved with respect to the holder, the park gear is engaged with some of the plurality of engagement mechanisms which are not moved with respect to the holder. When the parking assembly is moved away from the park gear, the park gear is disengaged from the plurality of engagement mechanisms.

According to the parking brake as discussed above, the parking assembly is only required to be moved in the axial direction of the park gear to be movable between the parking position and the releasing position.

In addition, the engagement mechanisms are movable, thus when the park gear presses the engagement mechanisms, and some of the engagement mechanisms are pressed by the park gear, some of the engagement mechanisms which are not moved with respect to the holder can match the contour of part of the park gear in order to engage with the park gear. Therefore, the park gear is able to directly and fully engage with the parking assembly in 360 degrees.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
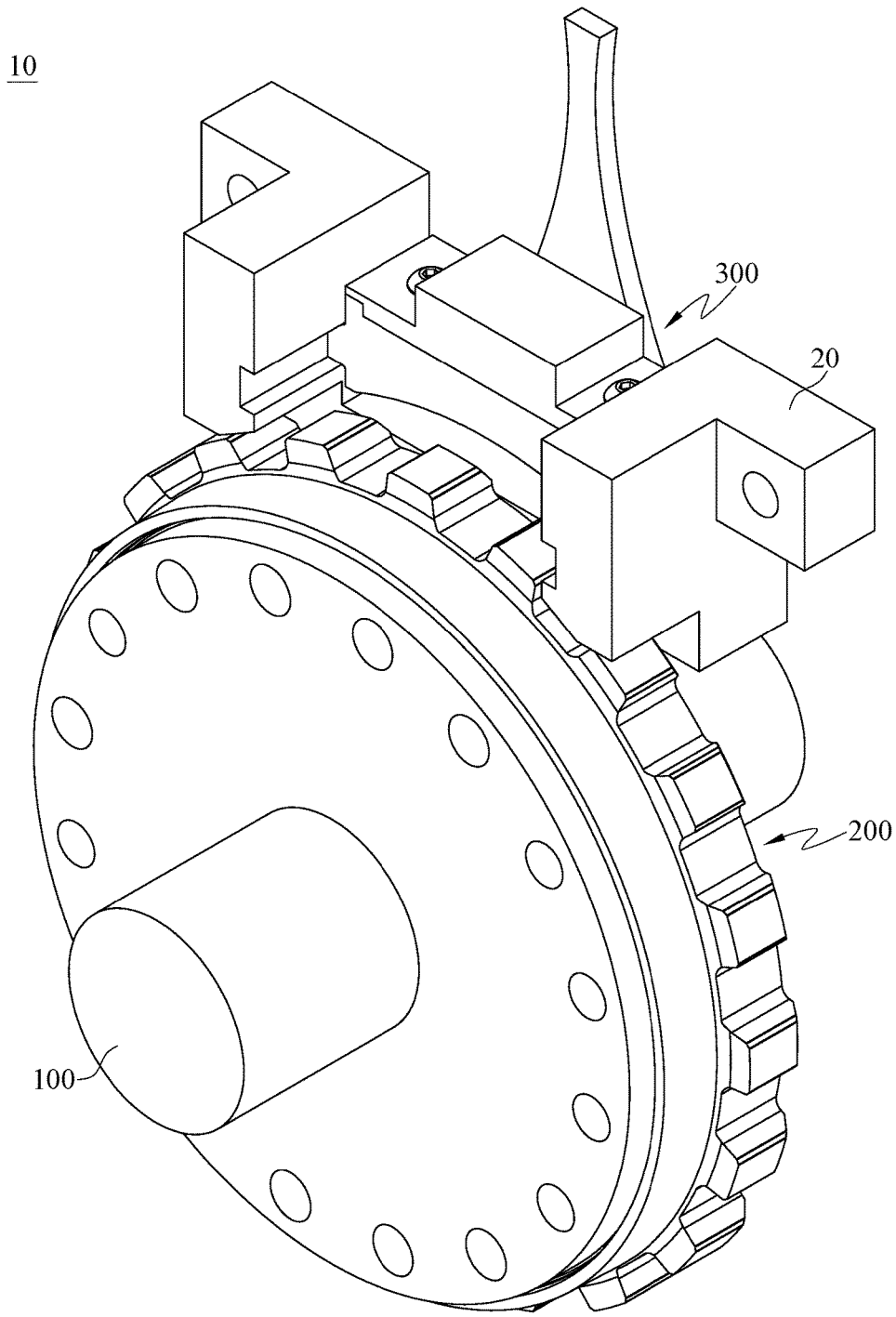
FIG. 1 is a perspective view of a parking brake according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
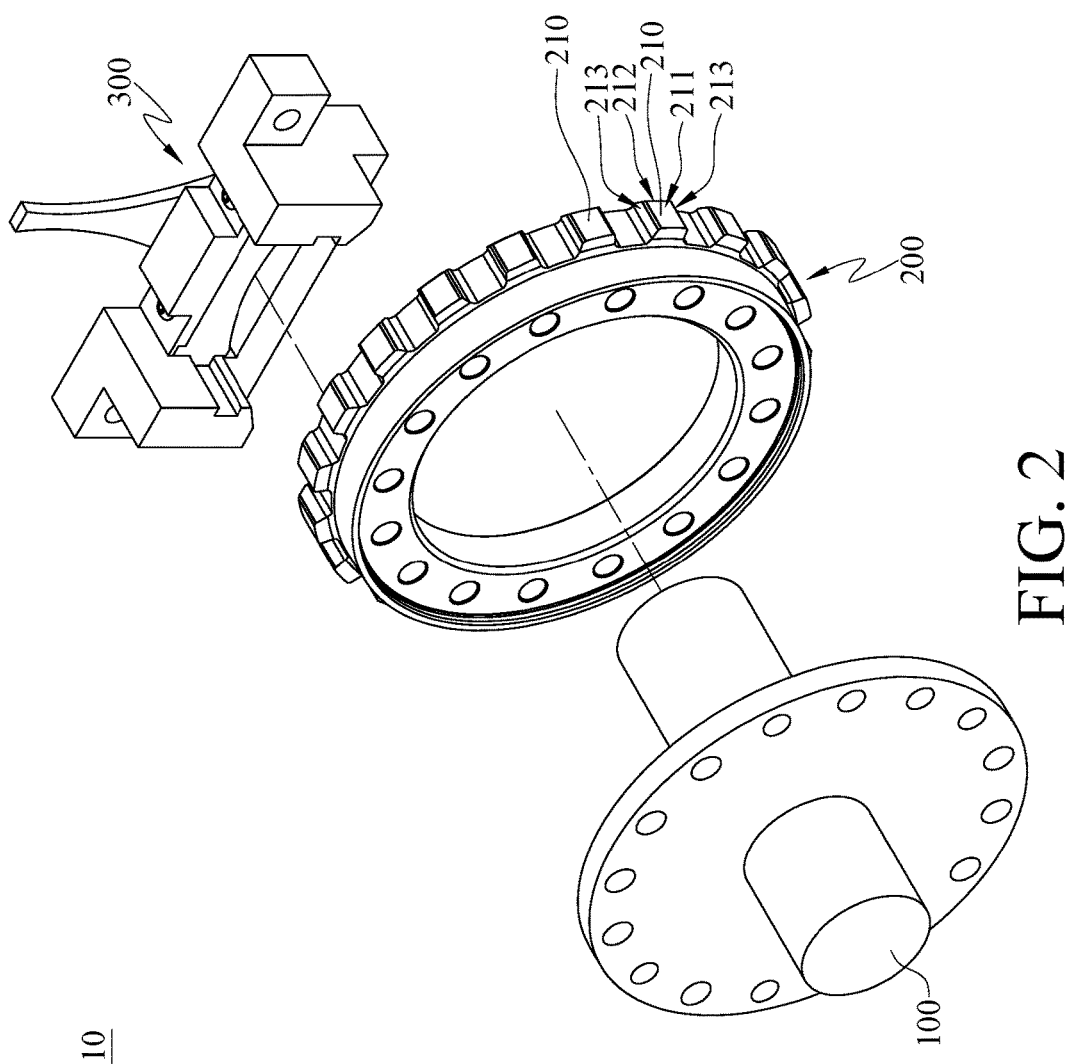
FIG. 2 is an exploded view of the parking brake in FIG. 1.
Figure 3:
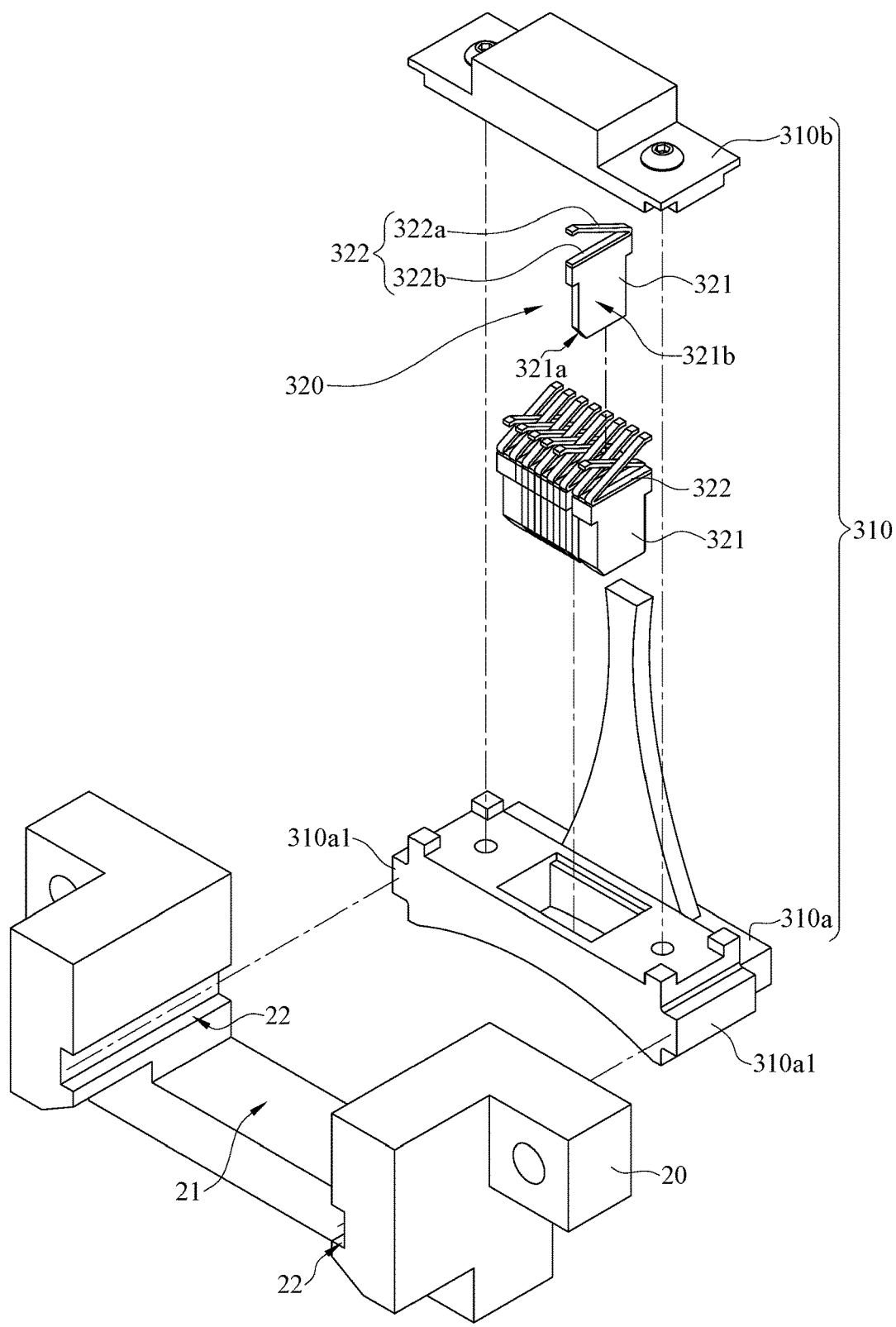
FIG. 3 is an exploded view of a parking assembly in FIG. 2.
Figure 4:
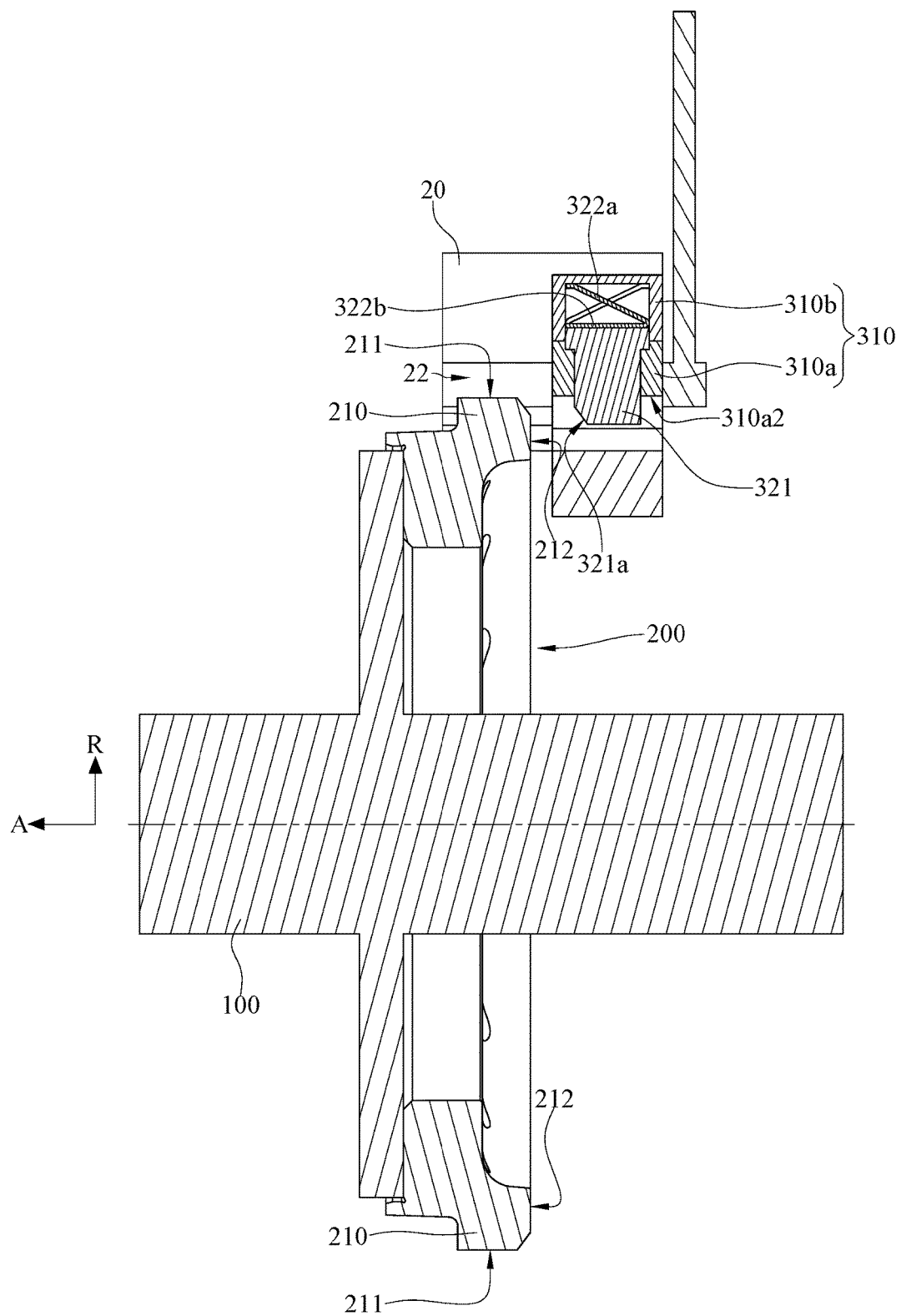
FIG. 4 is a cross-sectional view of the parking brake when the parking assembly is at a releasing position according to the first embodiment of the present disclosure.
Figure 5:
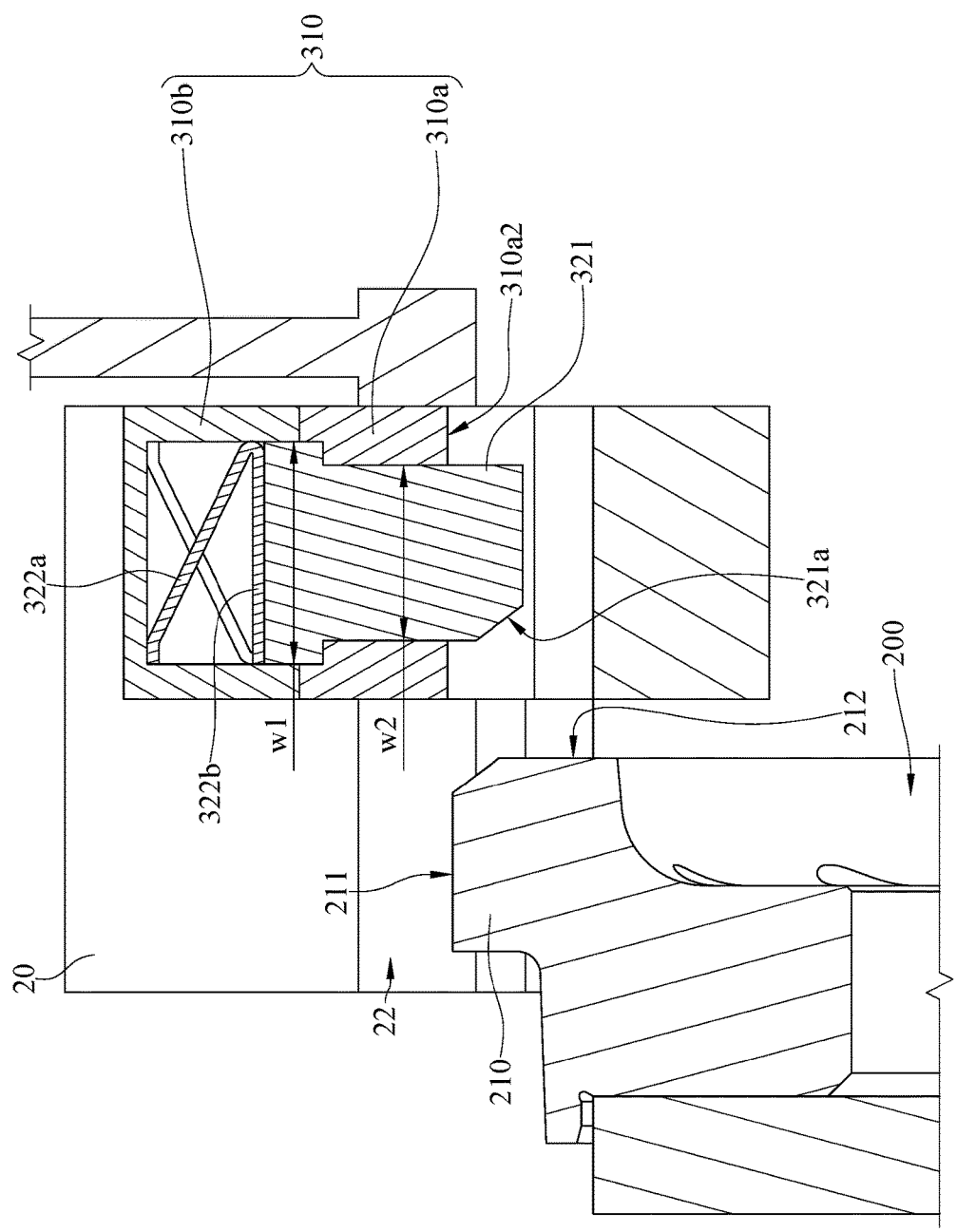
FIG. 5 is a partial enlarged view of the parking brake in FIG. 4.

Please refer to FIGS. 1 to 5. FIG. 1 is a perspective view of a parking brake according to a first embodiment of the present disclosure. FIG. 2 is an exploded view of the parking brake in FIG. 1. FIG. 3 is an exploded view of a parking assembly in FIG. 2. FIG. 4 is a cross-sectional view of the parking brake when the parking assembly is at a releasing position according to the first embodiment of the present disclosure. FIG. 5 is a partial enlarged view of the parking brake in FIG. 4.

In this embodiment, a parking brake 10 is provided. The parking brake 10 includes a transmission shaft (or called output shaft) 100, a park gear 200 and a parking assembly 300.

The park gear 200 is coaxially connected to the transmission shaft 100, and the park gear 200 is rotatable by the transmission shaft 100. That is, the transmission shaft 100 is able to drive the park gear 200 to rotate jointly.

The parking assembly 300 includes a holder 310 and a plurality of engagement mechanisms 320. The holder 310 is furnished on the transmission shaft 100 and slidable in an axial direction of the transmission shaft 100. In this embodiment, the holder 310 includes a base 310a and a cover 310b. The engagement mechanisms 320 are furnished on the base 310a. The base 310a is furnished on a support 20 and slidable in the axial direction of the transmission shaft 100. In detail, the support 20 has an accommodating space 21 and two first guiding structures 22. Each first guiding structure 22 is, for example, a groove, and the two first guiding structures 22 are respectively located on two opposite sides of the accommodating space 21. The base 310a has two second guiding structures 310a1 which are respectively located on two opposite sides of the base 310a. Each second guiding structure 310a1 is, for example, a protrusion. The shape of the groove matches the shape of the protrusion. The two second guiding structures 310a1 are respectively slidably furnished on the two first guiding structures 22 so that the base 310a furnished on the support 20 is slidable in the axial direction of the transmission shaft 100. Therefore, the base 310a is able to be moved with respect to the support 20 between a releasing position (as shown in FIG. 4) and a parking position (as shown in FIG. 5).

Each of the engagement mechanisms 320 includes an engagement body 321 and an elastic member 322. In this embodiment, the engagement body 321 is a plate shaped object. The engagement body 321 is furnished on the holder 310 and slidable in a radial direction of the transmission shaft 100. The elastic member 322 includes a first arm 322a and a second arm 322b connected to each other. The second arms 322b are respectively furnished on the engagement bodies 321, the first arms 322a are reboundable and pressed against the cover 310b of the holder 310, and the engagement bodies 321 protrude from a surface 310a2 of the base 310a. The surface 310a2 is an outer surface of the base 310a.

In this embodiment, the engagement body 321 is a plate shaped object, but the present disclosure is not limited thereto. In some embodiments, the engagement body can be a cylinder-shaped object or a square cylinder shaped object. Moreover, the thickness of the engagement body 321 ranges between, for example, 2 millimeters and 7 millimeters, but the present disclosure is not limited thereto.

In this embodiment, a normal direction of the surface 310a2 of the base 310a is parallel to the radial direction of the transmission shaft 100. The park gear 200 has a plurality of teeth 210. Each tooth 210 in the plurality of teeth 210 has a top surface 211, a first side surface 212 and two second side surfaces 213. The top surface 211 is the surface of the top land of the tooth 210. Thus, when some of the teeth 210 face the surface 310a2 of the base 310a, the top surfaces 211 of some teeth 210 face the surface 310a2 of the base 310a. The first side surface 212 is connected to a side of the top surface 211 close to the engagement bodies 321. In other words, the first side surface 212 faces the engagement bodies 321. The two second side surfaces 213 of each tooth 210 respectively face another two adjacent teeth 210. Each engagement body 321 has a chamfer 321a and a side surface 321b connected to each other. The chamfer 321a is on a side of the engagement body 321 opposite to the surface 310a2 of the base 310a. Or, the chamfer 321a is on a side of the engagement body 321 facing the first side surfaces 212 of the teeth 210.

In addition, in this embodiment, the number of the parking assembly 300 is one, but the present disclosure is not limited thereto. In some embodiments, there can be more than one parking assembly 300.

Furthermore, in this embodiment, a width w1 of a side of the engagement body 321 close to the cover 310b is greater than a width w2 of another side of the engagement body 321 opposite to the cover 310b (as shown in FIG. 5).

Figure 6:
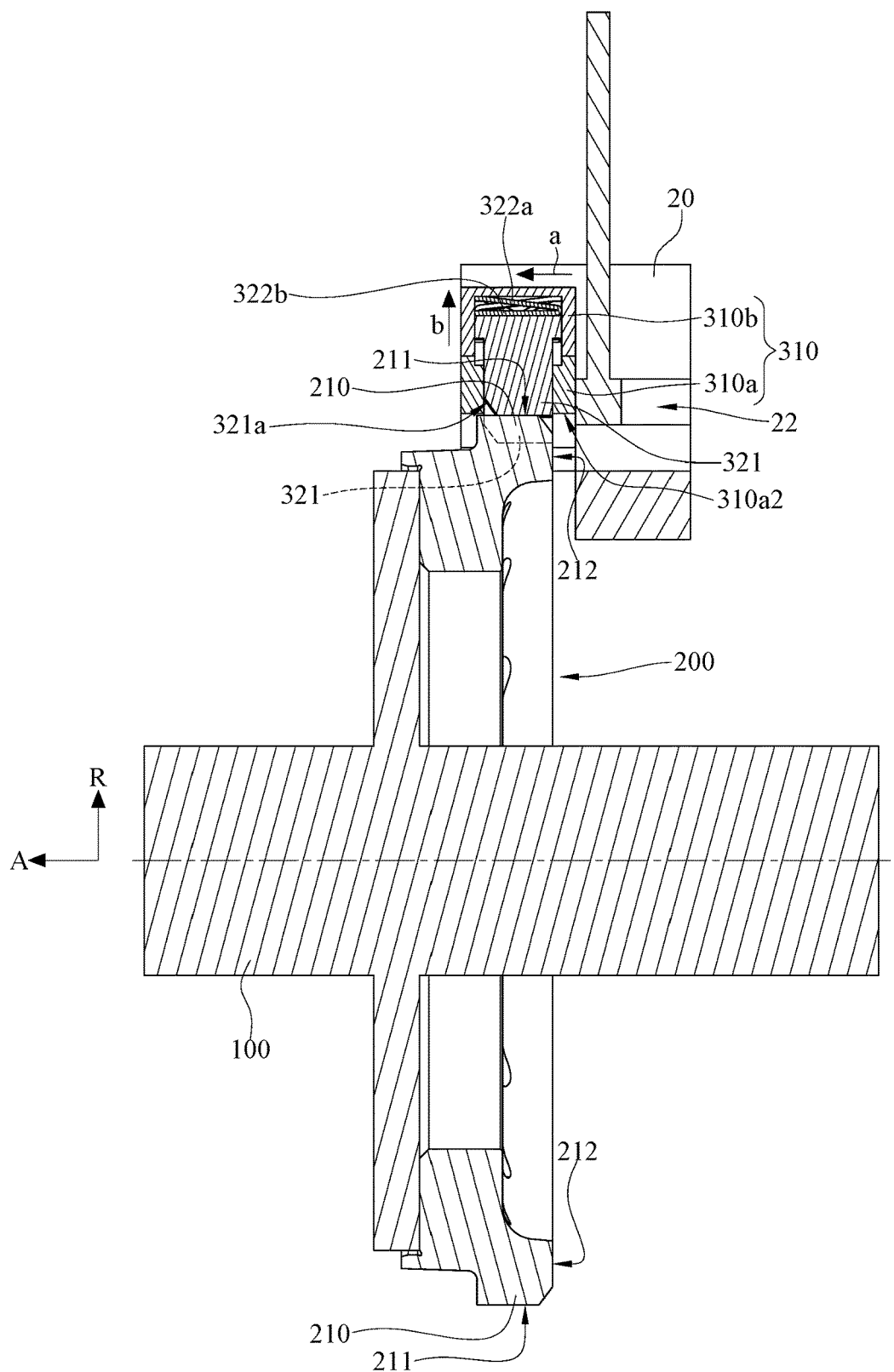
FIG. 6 is a cross-sectional view of the parking brake when the parking assembly is at a parking position according to the first embodiment of the present disclosure.
Figure 7:
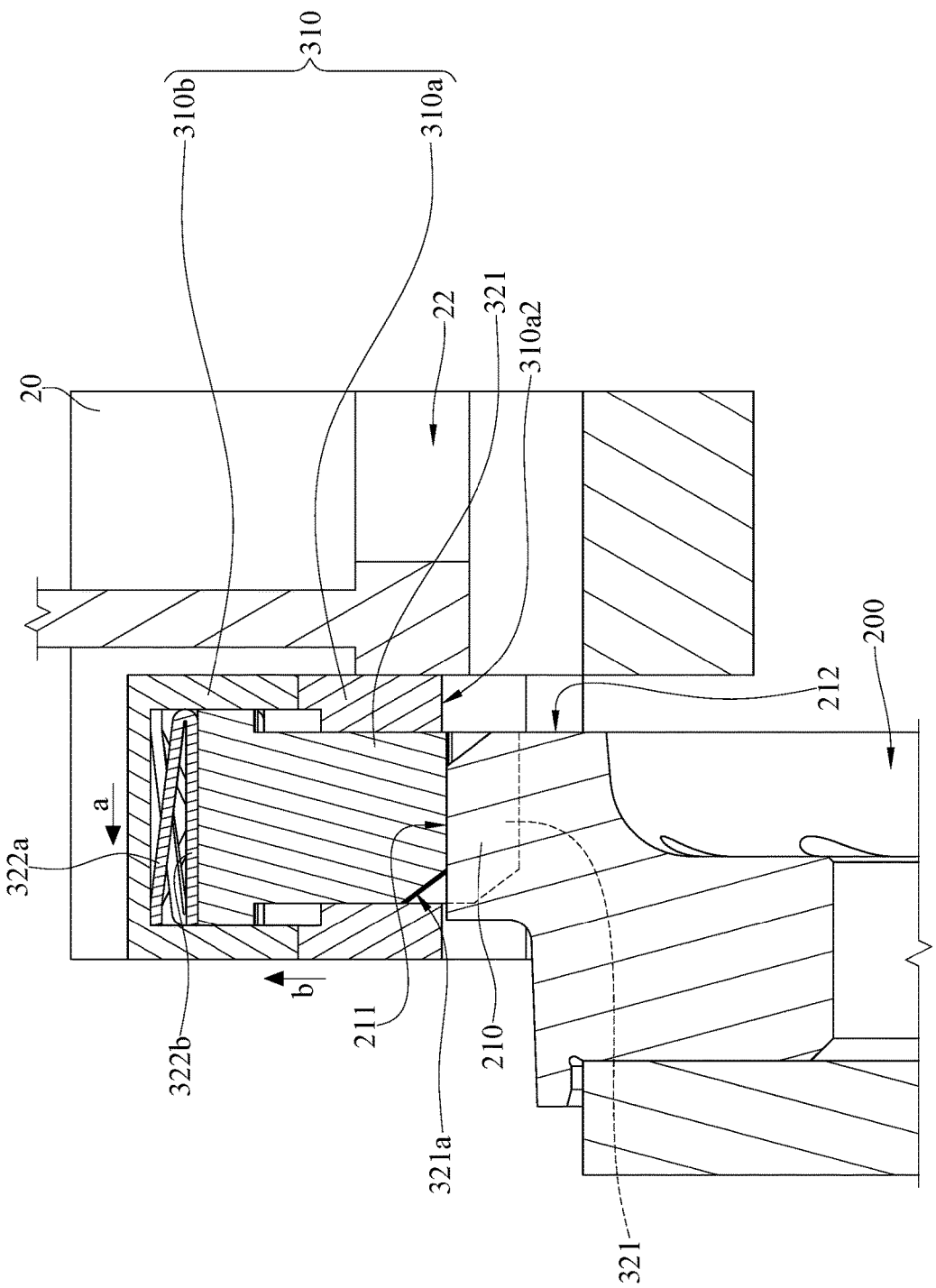
FIG. 7 is a partial enlarged view of the parking brake in FIG. 6.

Please refer to FIGS. 4 to 7. FIG. 6 is a cross-sectional view of the parking brake when the parking assembly is at a parking position according to the first embodiment of the present disclosure. FIG. 7 is a partial enlarged view of the parking brake in FIG. 6. As shown in FIGS. 4 and 5, when the parking assembly 300 is at the releasing position, the parking assembly 300 is separated from the park gear 200 so that the teeth 210 of the park gear 200 are not stopped by the engagement mechanisms 320. In such a case, the transmission shaft 100 is able to rotate the park gear 200. As shown in FIGS. 6 and 7, when the parking assembly 300 is moved toward the park gear 200 in the direction of arrow a to be at the parking position, the chamfers 321a of some of the engagement bodies 321 are pressed by the first side surfaces 212 of some of the teeth 210 so that the engagement bodies 321 pressed by the teeth 210 are moved with respect to the holder 310 in the direction of arrow b to be inserted into the holder 310. In such a case, the side surfaces 321b of the engagement mechanisms 320 which are not moved with respect to the holder 310 are pressed against the second side surfaces 213 of the teeth 210. That is, the engagement mechanisms 320 which are not moved with respect to the holder 310 are engaged with the teeth 210 of the park gear 200. Therefore, the park gear 200 is stopped from rotating.

There are two cases provided for further describing the present disclosure. The first case is in a parking situation. When a driver stops a vehicle and puts it in Park (P), the parking assembly 300 is moved in the axial direction A of the transmission shaft 100 (i.e. the direction of arrow a) to the parking position, and the parking assembly 300 is engaged with the park gear 200. In such a case, some of the engagement bodies 321 pressed by the teeth 210 of the park gear 200 are inserted into the base 310a, and some of the engagement bodies 321 which are not inserted into the base 310a and adjacent to the pressed engagement bodies 321 are located in the notches between the teeth 210 of the park gear 200. Therefore, the park gear 200 is stopped from rotating.

The second case is in a driving situation. When the driver shifts the vehicle out of Park, the parking assembly 300 is moved back to the releasing position in the opposite direction of arrow a, and the engagement bodies 321 are disengaged from the park gear 200 so that the transmission shaft 100 is able to rotate the park gear 200.

From the aforementioned two cases, the operation of the parking brake 10 is simple since the parking assembly 300 is only required to be moved in the axial direction of the transmission shaft 100. In addition, the parking assembly 300 is able to be directly and fully engaged with the park gear 200 since it has plural engagement mechanisms 320 movable in the radial direction of the transmission shaft 100.

In addition, the gap between the parking assembly 300 and the park gear 200 is small so that the parking assembly 300 and the park gear 200 are able to be perfectly engaged with each other regardless of the rotation direction of the park gear 200.

A stress analysis of the parking brake 10 is provided. It is supposed when a 2596-kilogram car is moving on a 30 degrees slope, and the parking brake 10 is furnished on the second shaft of the transmission case. The torque applied on the engagement body 321 is about 843.6 Nm, and the yield strength of the engagement body 321 is about 750 MPa. In the results: stress applied on the engagement body 321 is about 500 MPa; the displacements of the engagement bodies 321 are all less than 0.0833 mm; the stress on the contacting surface of the park gear 200 applied by the engaging portion of the engagement body 321 is about 926 MPa, but the highest value is about 1588 MPa. Accordingly, the engagement body 321 is able to take 846.3 Nm of torque, stress on part of the engagement body 321 is about 500 MPa, which is less than 750 MPa of yield strength, and the displacement of the engagement body 321 is less than 0.0833 mm.

Figure 8:
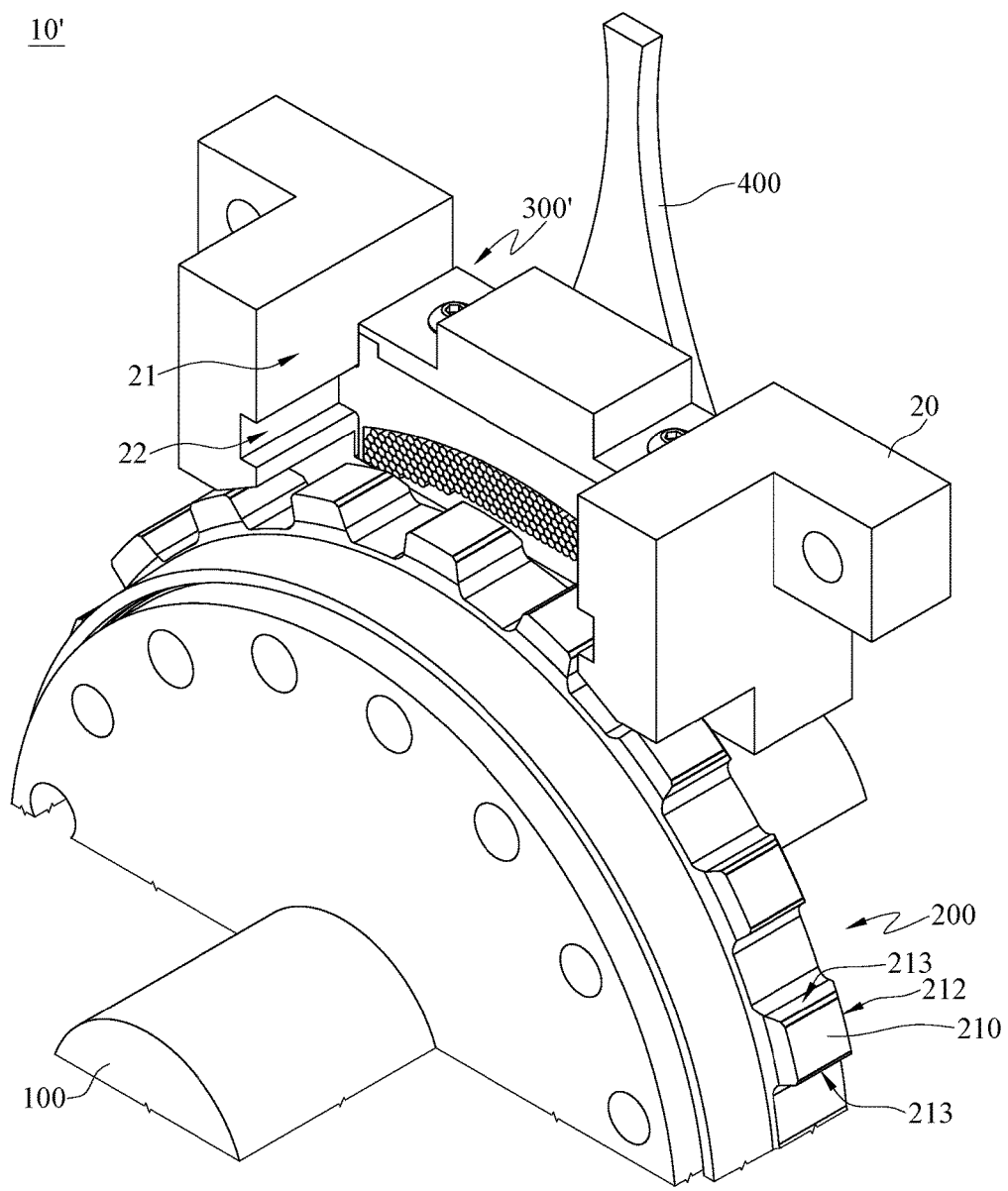
FIG. 8 is a partial perspective view of a parking brake according to a second embodiment of the present disclosure.
Figure 9:
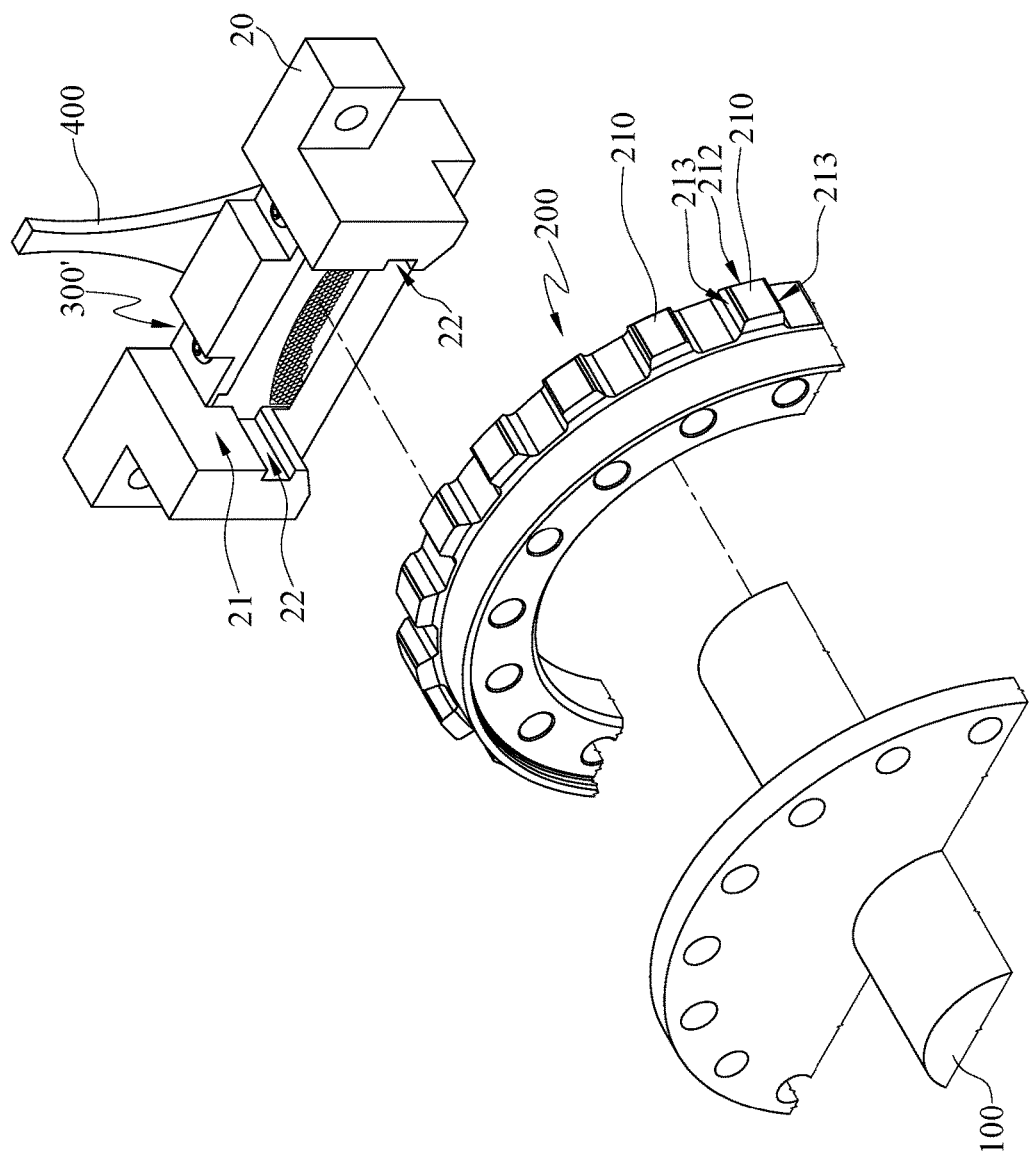
FIG. 9 is an exploded view of the parking brake in FIG. 8.
Figure 10:
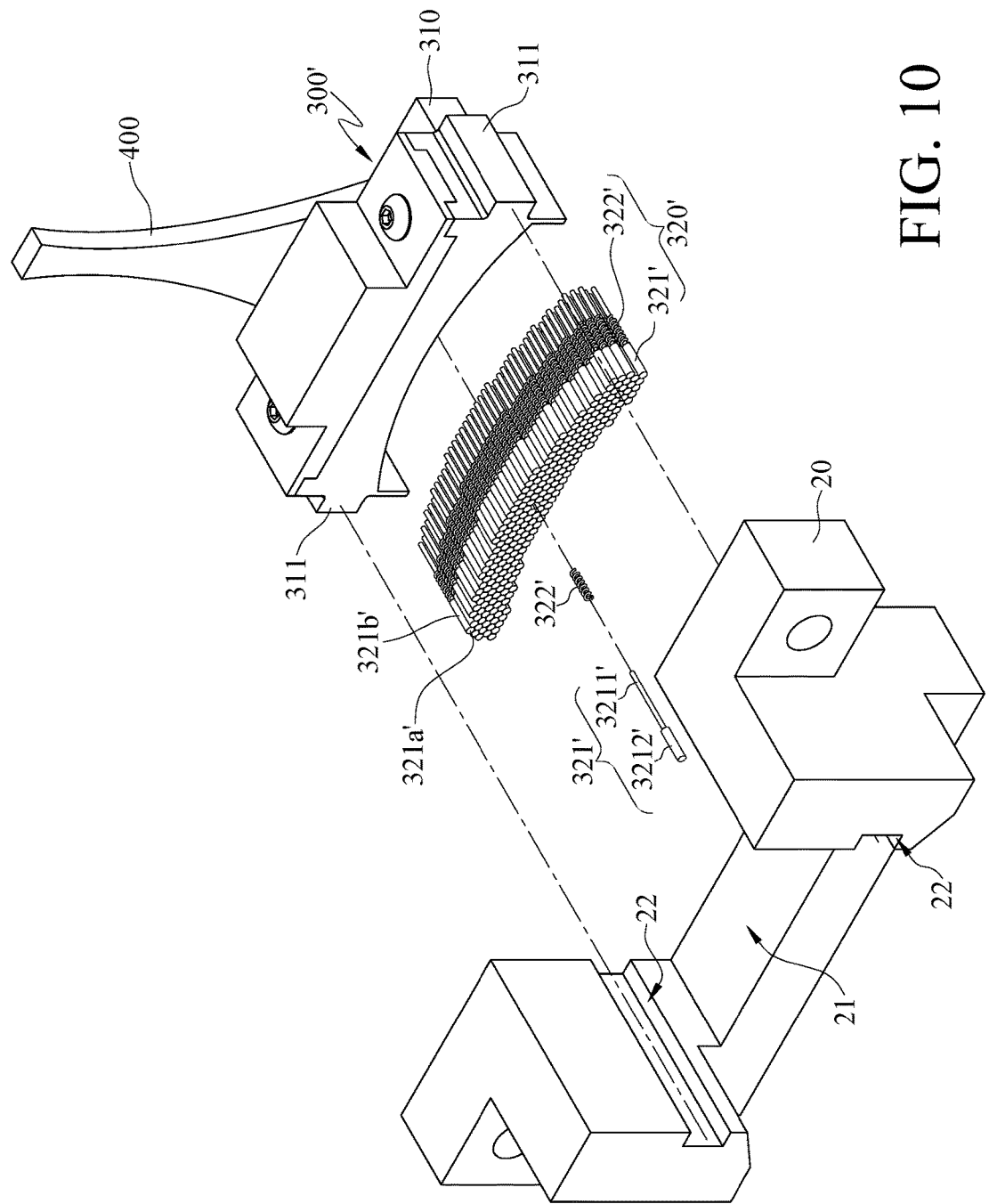
FIG. 10 is an exploded view of a parking assembly in FIG. 9.
Figure 11:
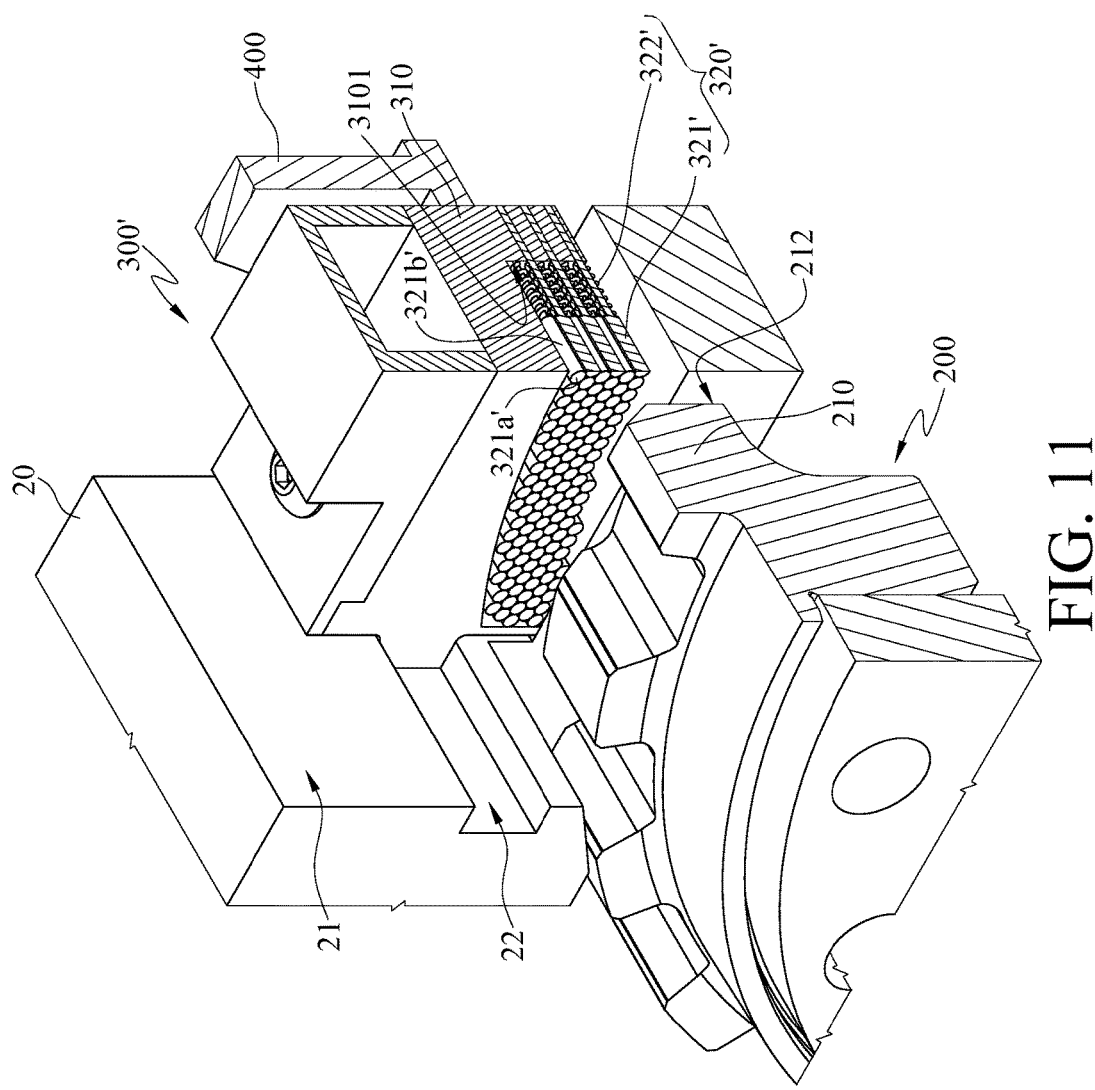
FIG. 11 is a perspective partial cross-sectional view of the parking brake when the parking assembly is at a releasing position according to the second embodiment of the present disclosure.

Please refer to FIGS. 8 to 11. FIG. 8 is a partial perspective view of a parking brake according to a second embodiment of the present disclosure. FIG. 9 is an exploded view of the parking brake in FIG. 8. FIG. 10 is an exploded view of a parking assembly in FIG. 9. FIG. 11 is a perspective partial cross-sectional view of the parking brake when the parking assembly is at a releasing position according to the second embodiment of the present disclosure.

In this embodiment, a parking brake 10' is provided. The parking brake 10' includes a transmission shaft 100, a park gear 200 and a parking assembly 300'.

The park gear 200 is coaxially connected to the transmission shaft 100, so the park gear 200 is rotatable by the transmission shaft 100. That is, the transmission shaft 100 is able to drive the park gear 200 to rotate jointly.

Figure 12:
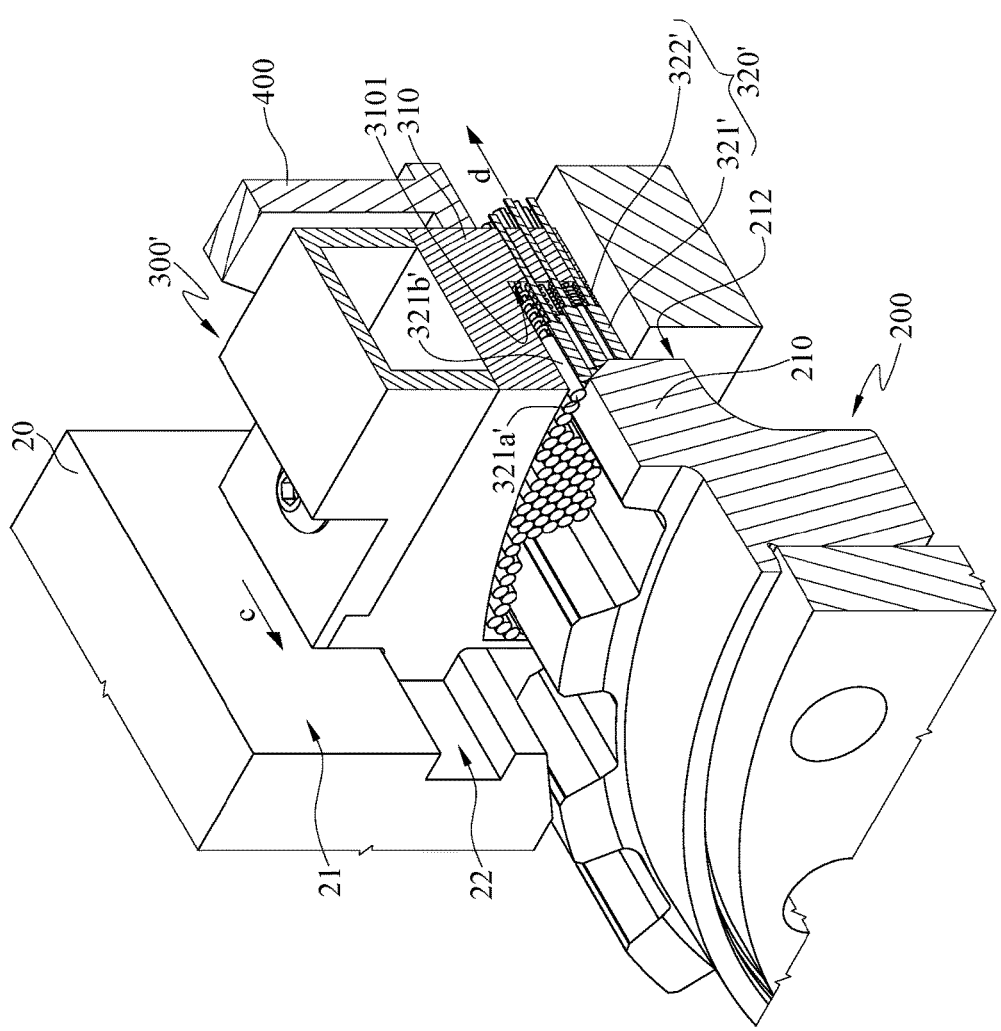
FIG. 12 is a perspective partial cross-sectional view of the parking brake when the parking assembly is at a parking position according to the second embodiment of the present disclosure.

The parking assembly 300' includes a holder 310 and a plurality of engagement mechanisms 320'. The holder 310 is furnished on the transmission shaft 100 and slidable in an axial direction of the transmission shaft 100. In this embodiment, the holder 310 is furnished on a support 20 and slidable in the axial direction of the transmission shaft 100. In detail, the support 20 has an accommodating space 21 and the two first guiding structures 22. Each first guiding structure 22 is, for example, a groove, and the two first guiding structures 22 are respectively located on two opposite sides of the accommodating space 21. The holder 310 has two second guiding structures 311 which are respectively located on two opposite sides of the holder 310. Each second guiding structure 311 is, for example, a protrusion. The shape of the groove matches the shape of the protrusion. The two second guiding structures 311 are respectively slidable furnished on the first guiding structures 22 so that the holder 310 furnished on the support 20 is able to slide in the axial direction of the transmission shaft 100. Therefore, the holder 310 is able to be moved with respect to the support 20 between a releasing position (as shown in FIG. 11) and a parking position (as shown in FIG. 12).

Each of the engagement mechanisms 320' includes an engagement body 321' and an elastic member 322'. In this embodiment, the engagement body 321' is a cylinder-shaped object. The engagement body 321' is furnished on the holder 310 and slidable in the axial direction of the transmission shaft 100. In detail, each engagement body 321' includes a mounting portion 3211' and an engaging portion 3212' connected to each other. The mounting portion 3211' is movably furnished on the holder 310. The engaging portion 3212' is located on a side of the mounting portion 3211' close to the park gear 200. In addition, a diameter of the engaging portion 3212' is greater than a diameter of the mounting portion 3211'. Specifically, the diameter of the engaging portion 3212' ranges, for example, between 3 millimeters and 5 millimeters, but the present disclosure is not limited thereto.

Each elastic member 322' is, for example, a compression spring. The elastic member 322' is clamped between the engaging portion 3212' and the holder 310, and the engagement body 321' protrudes from a surface 3101 of the holder 310. The surface 3101 is an outer surface of the holder 310. In addition, in this embodiment, each engagement body 321' has a front surface 321a' and a side surface 321b'. The front surface 321a' is on the side of the engagement body 321' opposite to the surface 3101 of the holder 310.

The park gear 200 has a plurality of teeth 210. Each tooth 210 has a first side surface 212 and two second side surfaces 213. The first side surface 212 faces the engagement bodies 321'. The two second side surfaces 213 of each tooth 210 respectively face another two adjacent teeth 210.

In this embodiment, the parking brake 10' further includes a transmission lever 400. One end of the transmission lever 400 is connected to a driving source (not shown), and another end of the transmission lever 400 is furnished on the holder 310. The driving source drives the parking assembly 300 via the transmission lever 400 in order for the transmission level 400 to move the parking assembly 300 between the releasing position and the parking position.

Please refer to FIGS. 11 to 12. FIG. 12 is a perspective partial cross-sectional view of the parking brake when the parking assembly is at a parking position according to the second embodiment of the present disclosure.

As shown in FIG. 11, when the parking assembly 300' is at the releasing position, the parking assembly 300' is separated from the park gear 200 so that the teeth 210 of the park gear 200 are not stopped by the engagement mechanisms 320'. In such a case, the transmission shaft 100 is able to rotate the park gear 200. As shown in FIG. 12, when the parking assembly 300' is moved toward the park gear 200 in the direction of arrow c to be at the parking position, some of the engagement bodies 321' are pressed by the first side surfaces 212 of some of the teeth 210 so that the engagement bodies 321' pressed by the teeth 210 are moved with respect to the holder 310 in the direction of arrow d to be inserted into the holder 310. In such a case, the engagement mechanisms 320' which are not moved with respect to the holder 310 and adjacent to the pressed engagement mechanisms 320' are pressed against the side surfaces 213 of the teeth 210, so the park gear 200 is stopped from rotating.

According to the parking brake as discussed in above, the parking assembly is only required to be moved in the axial direction of the park gear to be movable between the parking position and the releasing position, so the parking assembly is simple in operation and can be small in size.

In addition, the engagement mechanisms are movable, thus when the park gear presses the engagement mechanisms, some of the engagement mechanisms are pressed by the park gear, and some of the engagement mechanisms which are not moved with respect to the holder can match the contour of part of the park gear in order to engage with the park gear. Therefore, the park gear is able to directly and fully engage with the parking assembly in 360 degrees.

The embodiments were chosen and described in order to best explain the principles of the disclosure and its practical applications, to thereby enable others skilled in the art to best utilize the disclosure and various embodiments with various modifications as are suited to the particular use contemplated. It is intended that the scope of the disclosure be defined by the following claims and their equivalents.

What is claimed is:

1. A parking brake, comprising:
 a transmission shaft;
 a park gear coaxially connected to the transmission shaft, and the park gear rotatable by the transmission shaft; and
 at least one parking assembly, comprising:
  a holder furnished on the transmission shaft and slidable in an axial direction of the transmission shaft; and
  a plurality of engagement mechanisms each comprising an engagement body and an elastic member, the engagement body being a cylinder-shaped object, the engagement body furnished on the holder and slidable in the axial direction of the transmission shaft, the elastic members connected to the holder and respectively connected to the engagement bodies, the elastic members located between the holder and the engagement bodies, and the engagement bodies protruding from a surface of the holder;
 wherein, when the at least one parking assembly is moved toward the park gear, and some of the engagement bodies are pressed by the park gear to be moved with respect to the holder, the park gear is engaged with some of the engagement bodies which are not moved with respect to the holder; and when the at least one parking assembly is moved away from the park gear, the park gear is disengaged from the plurality of engagement mechanisms.

2. The parking brake according to claim 1, wherein a normal direction of the surface of the holder is parallel to the axial direction of the transmission shaft, the park gear has a plurality of teeth, each tooth in the plurality of teeth has a first side surface and two second side surfaces, the first side surfaces of some of the teeth in the plurality of teeth face the surface of the holder, the two second side surfaces of one of the tooth in the plurality of teeth respectively face the adjacent teeth in the plurality of teeth, each of the engagement bodies has a front surface and a side surface which are connected to each other, the front surface is on the side of the engagement body opposite to the surface of the holder, when the at least one parking assembly is at a releasing position, the front surfaces of the engagement bodies face the park gear, the side surfaces of the adjacent engagement bodies face to each other; and when the parking assembly is moved toward the park gear to a parking position, the side surfaces of some of the engagement bodies are pressed against the second side surfaces of some of the teeth in the plurality of teeth.

3. The parking brake according to claim 2, further comprising a transmission lever, one end of the transmission lever is connected to a driving source, and another end of the transmission lever is furnished on the holder in order for the transmission lever to move the at least one parking assembly between the releasing position and the parking position.

4. The parking brake according to claim 1, wherein the elastic member is a compression spring clamped between the engagement body and the holder.

5. The parking brake according to claim 1, wherein the parking brake is configured to be furnished on a support, the support has at least one first guiding structure, the holder has at least one second guiding structure, one out of the at least one first guiding structure and the at least one second guiding structure is a protrusion and the other is a groove, the shape of the protrusion matches the shape of the groove, and the at least one second guiding structure is slidably furnished on the at least one first guiding structure.

6. The parking brake according to claim 1, wherein the holder comprises a base and at least one cover, the at least one cover is detachably furnished on the base, and the plurality of engagement mechanisms are furnished on the base.

7. The parking brake according to claim 1, wherein each of the engagement bodies comprises a mounting portion and an engaging portion, the mounting portion is movably furnished on the holder, and the engaging portion is furnished on an end of the mounting portion close to the park gear.

8. The parking brake according to claim 7, wherein a diameter of the engaging portion is greater than a diameter of the mounting portion, and one of the elastic members is clamped between the engaging portion and the holder.

9. The parking brake according to claim 8, wherein the diameter of the engaging portion ranges between 3 millimeters and 5 millimeters.

10. The parking brake according to claim 1, wherein the number of the at least one parking assembly is more than one.

11. A parking brake, comprising:
 a transmission shaft;
 a park gear coaxially connected to the transmission shaft, and the park gear rotatable by the transmission shaft; and
 at least one parking assembly, comprising:
  a holder furnished on the transmission shaft and slidable in an axial direction of the transmission shaft; and
  a plurality of engagement mechanisms each comprising an engagement body and an elastic member, the engagement body being a plate shaped object, the engagement body furnished on the holder and slidable in a radial direction of the transmission shaft, the elastic members connected to the holder and respectively connected to the engagement bodies, the elastic members located between the holder and the engagement bodies, and the engagement bodies protruding from a surface of the holder;

wherein, when the at least one parking assembly is moved toward the park gear, and some of the engagement bodies are pressed by the park gear to be moved with respect to the holder, the park gear is engaged with some of the plurality of engagement mechanisms which are not moved with respect to the holder; and when the at least one parking assembly is moved away from the park gear, the park gear is disengaged from the plurality of engagement mechanisms.

12. The parking brake according to claim 11, wherein a normal direction of the surface of the holder is parallel to the radial direction of the transmission shaft, the park gear has a plurality of teeth, each tooth in the plurality of teeth has a top surface, a first side surface and two second side surfaces, the top surfaces of some of the teeth in the plurality of teeth face the surface of the holder, the first side surface is connected to a side of the top surface close to the engagement bodies, the second side surfaces of each tooth in the plurality of teeth respectively face the adjacent teeth in the plurality of teeth, each of the engagement bodies has a side surface, when the at least one parking assembly is at a releasing position, the adjacent engagement bodies are aligned to each other; and when the at least one parking assembly is moved toward the park gear to a parking position, the side surfaces of some of the engagement bodies are pressed against the second side surfaces of some of the teeth in the plurality of teeth.

13. The parking brake according to claim 12, further comprising a transmission lever, one end of the transmission lever is connected to a driving source, and another end of the transmission lever is furnished on the holder in order to move the at least one parking assembly between the releasing position and the parking position.

14. The parking brake according to claim 12, wherein the holder comprises a base and at least one cover, the at least one cover is detachably furnished on the base, and the plurality of engagement mechanisms are furnished on the base.

15. The parking brake according to claim 14, wherein each of the engagement bodies has a chamfer, the chamfer is connected to the side surface of each of the engagement bodies; when the at least one parking assembly is at the releasing position, the chamfers of the engagement bodies face the first side surfaces of some of the teeth in the plurality of teeth.

16. The parking brake according to claim 14, wherein a width of a side of each of the engagement bodies close to the cover is greater than a width of another side of each of the engagement bodies opposite to the cover.

17. The parking brake according to claim 11, wherein each of the elastic members comprises a first arm and a second arm connected to each other, the second arms of the elastic members are respectively furnished on the engagement bodies, and the first arms are pressed against the holder.

18. The parking brake according to claim 11, wherein the parking brake is configured to be furnished on a support, the support has at least one first guiding structure, the holder has at least one second guiding structure, one out of the at least one first guiding structure and the at least one second guiding structure is a protrusion and the other is a groove, the shape of the protrusion matches the shape of the groove, and the at least one second guiding structure is slidable furnished on the at least one first guiding structure.

19. The parking brake according to claim 11, wherein the number of the at least one parking assembly is more than one.

20. The parking brake according to claim 11, wherein the thickness of the engagement body ranges between 2 millimeters and 7 millimeters.

* * * * *